United States Patent
Acharya et al.

(10) Patent No.: US 7,701,854 B2
(45) Date of Patent: Apr. 20, 2010

(54) DIFFERENTIATED HANDLING OF SIP MESSAGES FOR VOIP CALL CONTROL

(75) Inventors: Arup Acharya, Nanuet, NY (US); Dilip Dinkar Kandlur, San Jose, CA (US); Prashant Pradhan, New Rochelle, NY (US)

(73) Assignee: International Business Machines Corporation, Armonk, NY (US)

( * ) Notice: Subject to any disclaimer, the term of this patent is extended or adjusted under 35 U.S.C. 154(b) by 1163 days.

(21) Appl. No.: 10/714,732

(22) Filed: Nov. 17, 2003

(65) Prior Publication Data

US 2005/0105464 A1    May 19, 2005

(51) Int. Cl.
    *H04L 12/26* (2006.01)
(52) U.S. Cl. .............. 370/235; 370/230.1; 370/429
(58) Field of Classification Search ......... 370/230, 370/230.1, 231, 232, 233, 234, 235, 352, 370/412, 428, 429
    See application file for complete search history.

(56) References Cited

U.S. PATENT DOCUMENTS

| | | | | |
|---|---|---|---|---|
| 5,231,633 A * | 7/1993 | Hluchyj et al. | ............ | 370/429 |
| 5,268,900 A * | 12/1993 | Hluchyj et al. | ............ | 370/429 |
| 6,169,747 B1 * | 1/2001 | Sartain et al. | ............ | 370/468 |
| 6,314,085 B1 * | 11/2001 | Saranka | ............ | 370/230 |
| 6,625,141 B1 * | 9/2003 | Glitho et al. | ............ | 370/352 |
| 6,697,330 B1 * | 2/2004 | Melvin et al. | ............ | 370/235 |
| 6,704,396 B2 * | 3/2004 | Parolkar et al. | ............ | 379/88.17 |
| 6,741,586 B1 * | 5/2004 | Schuster et al. | ............ | 370/352 |
| 6,826,147 B1 * | 11/2004 | Nandy et al. | ............ | 370/229 |
| 6,944,150 B1 * | 9/2005 | McConnell et al. | ............ | 370/352 |
| 6,963,635 B1 * | 11/2005 | Jones | ............ | 379/114.14 |
| 6,977,930 B1 * | 12/2005 | Epps et al. | ............ | 370/392 |
| 7,072,297 B2 * | 7/2006 | Grosdidier et al. | ............ | 370/231 |
| 7,102,997 B2 * | 9/2006 | Sultan et al. | ............ | 370/233 |
| 7,151,781 B2 * | 12/2006 | MeLampy et al. | ............ | 370/468 |
| 7,177,276 B1 * | 2/2007 | Epps et al. | ............ | 370/230 |
| 7,225,271 B1 * | 5/2007 | DiBiasio et al. | ............ | 709/240 |
| 7,227,842 B1 * | 6/2007 | Ji et al. | ............ | 370/235 |
| 7,330,433 B2 * | 2/2008 | Shao et al. | ............ | 370/235 |
| 2002/0145975 A1 * | 10/2002 | MeLampy et al. | ............ | 370/235 |
| 2002/0159439 A1 * | 10/2002 | Marsh et al. | ............ | 370/352 |
| 2003/0076848 A1 * | 4/2003 | Bremler-Barr et al. | ............ | 370/412 |
| 2003/0152096 A1 * | 8/2003 | Chapman | ............ | 370/412 |
| 2003/0224781 A1 * | 12/2003 | Milford et al. | ............ | 455/426.1 |
| 2003/0231593 A1 * | 12/2003 | Bauman et al. | ............ | 370/235 |
| 2004/0153497 A1 * | 8/2004 | Van Dyke et al. | ............ | 709/201 |
| 2004/0205190 A1 * | 10/2004 | Chong et al. | ............ | 709/225 |
| 2004/0213150 A1 * | 10/2004 | Krause et al. | ............ | 370/229 |
| 2004/0213210 A1 * | 10/2004 | Dube et al. | ............ | 370/352 |
| 2004/0236966 A1 * | 11/2004 | D'Souza et al. | ............ | 713/201 |
| 2005/0041584 A1 * | 2/2005 | Lau et al. | ............ | 370/235 |

(Continued)

*Primary Examiner*—Chi H. Pham
*Assistant Examiner*—Kevin Mew
(74) *Attorney, Agent, or Firm*—F. Chau & Associates, LLC

(57) ABSTRACT

Systems and methods are disclosed for differentiated handling of VoIP call control messages according to their importance and functionality, thus providing to VoIP infrastructures a level of robust call control similar to that in PSTN networks. SIP messages are classified by their type or content, and resources of a VoIP call control server are allocated to the SIP messages according to a policy. The scheme also provides overload protection and prioritized handling of certain kinds of requests in VoIP call control servers.

10 Claims, 2 Drawing Sheets

U.S. PATENT DOCUMENTS

2005/0058068 A1* 3/2005 Ben Ali et al. .............. 370/230
2005/0073997 A1* 4/2005 Riley et al. ................. 370/352
2005/0249220 A1* 11/2005 Olsen et al. ............. 370/395.4
2005/0251846 A1* 11/2005 Dravida et al. .............. 725/129
2006/0218302 A1* 9/2006 Chia et al. ................. 709/245
2007/0153697 A1* 7/2007 Kwan et al. ................ 370/235

* cited by examiner

DIFFERENTIATED HANDLING OF SIP MESSAGES FOR VOIP CALL CONTROL

FIELD OF THE INVENTION

The present invention is directed to the field of computer networks. It is more particularly directed to Voice-over-Internet Protocol (VoIP) networks using the Session Initiation Protocol (SIP).

BACKGROUND OF THE INVENTION

Traditional telephony carriers (Public Switched Telephony networks or PSTN) are moving towards a packet-based VoIP infrastructure. A key component of any telephony infrastructure is Call Control. Call control includes call setup and teardown. In VoIP, call control may be achieved through SIP. SIP is a standard protocol for VoIP messages. The SIP messages are text-based.

A key requirement for a robust VoIP call control infrastructure is overload control. Since VoIP is an emerging area and different components of the infrastructure are presently in a trial phase, large scale deployments of VoIP has not yet taken place. Once large scale deployments begin, call control in VoIP infrastructure will become critical in avoiding service outages and loss of revenue. Since VoIP is an emerging area, there has been little work on overload protection of VoIP servers.

In addition to landline telephony services, SIP has also been chosen as a signaling mechanism for third generation (3G) mobile telephony services, specifically by the 3GPP standards body in its release UMTS R00. The implication of this development is that overload protection for the SIP-based call control infrastructure is needed both for landline and mobile telephony services. A second implication is that in mobile telephony services, the control infrastructure has to support not only call setup and teardown, but the control infrastructure also has to handle terminal mobility between different cell boundaries. This support for hand-off represents an additional load on the call control servers.

Another important development is the use of SIP to carry instant messages (IM) and for supporting Presence. Presence is a term understood by persons of ordinary skill in the art and refers to the concept of letting interested users in the system know who is online/offline. For example, a SameTime server shows a "green" light next to someone logged in. Two methods are currently under standardization at the IETF standards body. One method, called SIMPLE, carries Instant Messaging payloads in SIP messages that conceivably will be processed by the same call control infrastructure, as networks moved towards offering converged voice and data services. Using SIP for Instant Messaging and Presence implies an additional load on the SIP based call control infrastructure.

In addition to handling call setup, teardown, hand-off and Instant Messaging, SIP call control servers need to also exchange routing information with other call control servers in order to route call setup messages appropriately.

For the reasons set forth above, there is a need in the art for a method and system of call control for SIP messages for VoIP.

SUMMARY OF THE INVENTION

It is thus an object of the present invention to classify SIP messages and place them in separate queues before the messages are processed by a call control server, thereby enabling partitioning of the server resources according to importance and functionality of the messages instead of handling messages in a first-in, first-out arrival sequence.

A second object of the present invention is the text-based classification of SIP messages according to the value of individual fields in a SIP message.

A third object of this invention is to classify SIP messages according to the intended function of the message. The functions may include terminal registration (SIP REGISTER), call setup (SIP INVITE), call teardown (SIP BYE), terminal mobility (SIP RE-INVITE), and Instant Messaging carried as payload in SIP messages.

A fourth object of the present invention is to apply different service rates to the individual queues holding SIP messages according to their intended function.

A fifth object of the present invention is to provide the highest priority to emergency calls (911) in a packet-based voice infrastructure.

These and other objects, features, and advantages of the present invention will become apparent upon further consideration of the following detailed description of the invention when read in conjunction with the accompanying drawing figures.

DESCRIPTION OF THE INVENTION

Figure 1:
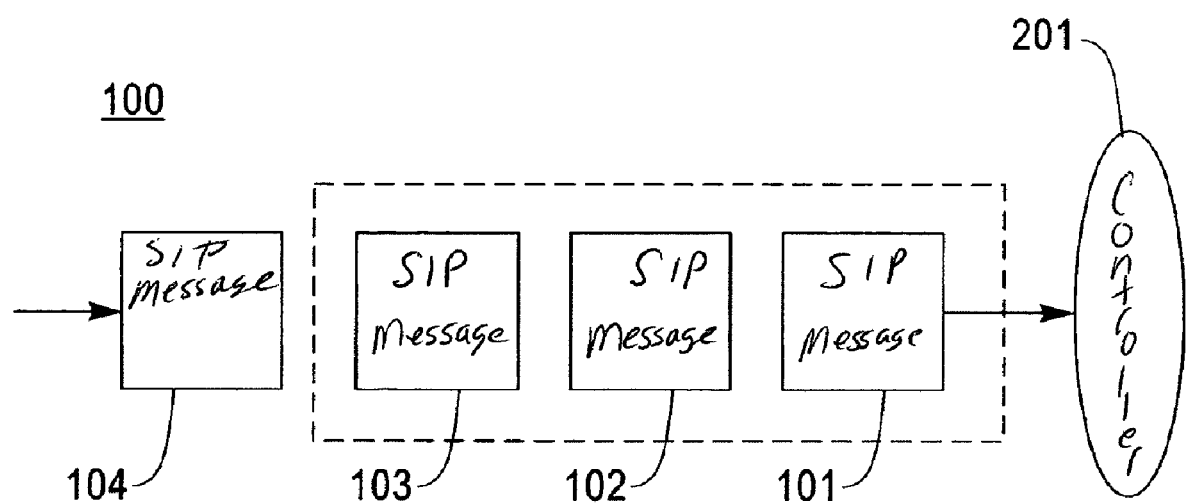
FIG. 1 illustrates the prior art handling of SIP messages.

FIG. 1 illustrates the handling of a SIP message queue 100 according to the prior art. The controller 201 simply responds to each of the SIP control messages 101-104. For example, the SIP message may be a request for a call hand-off in a cellular telephony system. The controller 201 receives the SIP message and accordingly orders the hand-off of the call associated with the message.

In the event that the SIP message 104 is associated with a 911 call, the prior art only provides a first-in, first-out handling of the SIP control messages. If the delay in processing the SIP messages 101-103 is large enough, the 911 call could be lost due to slow responsiveness to the hand-off request.

The present invention allows the differentiated handling of SIP call control messages. A person of ordinary skill in the art would recognize that key SIP messages may include INVITE (session initiation), reINVITE (session modification), REGISTER (bind an user to an address) and BYE (session termination). A combination of reINVITE and REGISTER may be used for handling user/terminal mobility. Incoming requests may be classified and tagged according to a policy specification. These requests can be considered analogous to web requests and can be handled according to a prioritization policy along with isolation of resources to handle each type of message.

Figure 2:
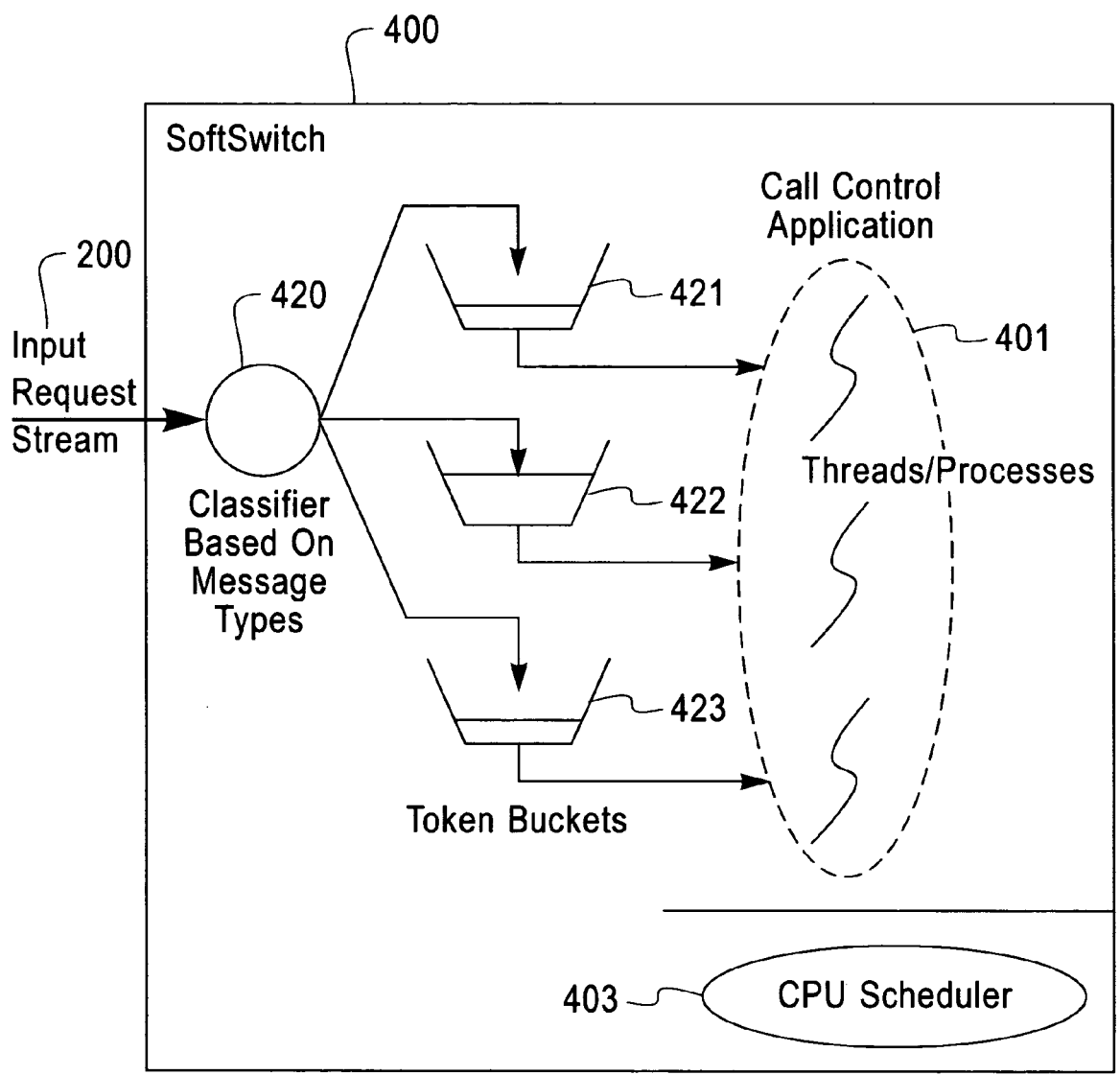
FIG. 2 illustrates the handling of SIP messages in accordance with one embodiment of the present invention.

FIG. 2 illustrates an embodiment of the system and method of the present invention. The invention may be viewed as a soft switch 400 receiving a stream of SIP call control messages 200. The stream 200 may also be referred to as a SIP server queue. A softswitch is a term understood by persons of ordinary skill in the art and it may include a SIP proxy, call control, user registration, etc. A softswitch essentially subsumes the role of what was conventionally accomplished through a telephony switch. The switch 400 may include a classifier 420; a number of token buckets 421-423; a controller 401; and a CPU scheduler.

The classifier 420 may be embodied as a software module, microcontroller, or filter that separates incoming messages according to the type of message. Because SIP messages are text-based, the incoming messages can be classified based not only on SIP, but also on specific types of application. The classifier 420 may also operate on other signaling protocols for communications setup defined in the future.

The token buckets 421-423 may be implemented as queues waiting to be processed by the controller 401 in order of importance or prioritization. The controller 401 reads the call control requests from the incoming messages and may accordingly perform call switching functions.

In the illustrated embodiment, given a prioritization of queues, the CPU scheduler 403 implements a controller 401 scheduling policy. The controller 401 represents threads running on the CPU associated with the switch and the CPU scheduler 403 schedules the threads for execution according to a scheduling policy. For example, the scheduler 403 may assign a processing percentage time of 50% processing time to queue 421, 30% to queue 422, and 20% to queue 423. The controller 401 may then process the requests accordingly. Still referring to FIG. 2, a description of one embodiment of the methodology of the present invention follows.

The architecture of the present invention includes inbound traffic control on SIP server queues to regulate processing of SIP messages, as described above. These messages go through a policer (e.g., the classifier 420) that may perform message overload protection by enforcing a leaky bucket flow control onto the incoming message stream. The tagged messages enter the system 400 and compete for processing resources. Service differentiation and QoS guarantees are provided to various classes of workload by scheduling them appropriately. The tags on various messages are visible to these schedulers, allowing them to treat each class of work differently according to its performance requirements.

As mentioned above, since SIP messages are text-based, the incoming messages can be classified based not only on SIP message types, but also on specific types of application. For example, 911 calls (sessions) can be accorded the highest priority (e.g., placed in queue 421 with a processing time of 50%). Similarly, SIP INVITE messages that require routing the call through a separate domain (e.g., an MCI caller to a AT&T callee) may be subject to bilateral peering arrangements on the rate of calls that the second domain has pre-negotiated. Thus different policies (rates) may need to be enforced on calls that terminate within the same domain compared to those which require SIP messages to be forwarded to another domain. Another requirement for partitioning of resources (computing/call processing) is driven by handling mobile calls versus regular fixed-line sessions (calls). This would be determined by the token bucket rates of the queues for handling SIP INVITE messages and SIP reINVITE messages. SIP messages that use inter-domain softswitch signaling (SIP BCP-T) are another set of messages that may need to be rate-controlled and guaranteed a minimum share of call-processing resources.

An example SIP INVITE message is shown below. The example highlights the text-based nature of the SIP protocol, which allows for service differentiation of SIP messages based on message content as well as message type.
INVITE sip:bob@biloxi.com SIP/2.0
Via: SIP/2.0/UDP 12.26.17.91:5060
Max-Forwards: 70
To: Bob <sip:bob@biloxi.com>
From: Alice <sip:alice@atlanta.com;tag=1928301774>
Call-ID: a84b4c76e66710@12.26.17.91
CSeq: 314159 INVITE
Contact: <sip:alice@atlanta.com>
Content-Type: application/sdp
Content-Length: 142

In this example, this message represents a new call setup request since it is an INVITE message. The classifier 420 will place it in the queue for handling new call setups.

The present invention thus includes a switching method for differentiated services that provides VoIP networks a level of service guarantees so far available only in Public Switched Telephony Networks (PSTN).

While the invention has been described in terms of a single embodiment, those skilled in the art will recognize that the invention can be practiced with modification within the spirit and scope of the appended claims. Further, it is noted that, Applicants' intent is to encompass equivalents of all claim elements, even if amended later during prosecution.

Having thus described our invention, what we claim as new and desire to secure by Letters Patent is as follows:

1. A method for handling Session Initiation Protocol ("SIP") messages for voice over Internet Packet call control, comprising:
   a processor for performing the method comprising:
   receiving a stream of SIP messages;
   classifying each of the SIP messages as one of at least two message types;
   placing said SIP messages in separate queues associated to the message types;
   allocating SIP call control server processing resources to each queue according to a pre-defined policy associated with the message types, wherein the step of allocating SIP call control server processing resources comprises allocating a percentage of the SIP call control server processing resources to each of the queues; and
   leaking the messages from at least one of the queues for enforcing a message overload protection for the associated message type.

2. The method of claim 1, wherein the step of classifying each of the SIP messages comprises classifying the messages as a REGISTER, INVITE, or RE-INVITE message.

3. The method of claim 2, wherein the step of classifying each of the SIP messages comprises classifying a message as an emergency call message by reading the destination address of a SIP INVITE message.

4. The method of claim 1, wherein the step of allocating the SIP call control server processing resources comprises controlling a rate at which messages from individual users are processed by a call control server, thereby preventing denial-of-service attacks on the call control server by individual servers in a packet-based VoIP infrastructure.

5. A softswitch for handling Session Initiation Protocol ("SIP") messages for voice over Internet Packet call control, said softswitch comprising:
   a processor and software threads, the software threads being executed by the processor to perform a method comprising:
   receiving a stream of SIP messages;
   classifying each of the SIP messages as one of at least two message types;
   placing said SIP messages in separate queues associated to the message types;
   allocating SIP call control server processing resources to each queue according to a pre-defined policy associated with the message types, wherein the step of allocating SIP call control server processing resources comprises allocating a percentage of the SIP call control server processing resources to each of the queues; and leaking the messages from at least one of the queues for enforcing a message overload protection for the associated message type.

6. The softswitch of claim 5, wherein the step of classifying each of the SIP messages comprises classifying the messages as a REGISTER, INVITE, or RE-INVITE message.

7. The softswitch of claim 6, wherein the step of classifying each of the SIP messages comprises classifying a message as an emergency call message by reading the destination address of a SIP INVITE message.

8. The softswitch of claim 5, wherein the step of allocating the SIP call control server processing resources comprises controlling a rate at which messages from individual users are processed by a call control server, thereby preventing denial-of-service attacks on the call control server by individual servers in a packet-based VoIP infrastructure.

9. A system for handling Session Initiation Protocol ("SIP") messages for voice over Internet Packet call control, comprising:
   a classifier for receiving a stream of SIP messages and classifying the messages as one of at least two message types;
   a plurality of queues associated to the message types, wherein the messages are placed in one of the plurality of queues according to a classification of the message and leaked from at least one of the queues for enforcing a message overload protection for the associated message type;
   a controller for directing calls corresponding to the messages waiting to be served in the queues, wherein the controller comprises a plurality of threads of the messages retrieved from the plurality of buckets running on a processor of the system, wherein each of the plurality of threads corresponds to a respective one of the plurality of queues; and
   a scheduler for allocating SIP call control server processing resources to each queue according to a pre-defined policy associated with a corresponding message type, wherein the queues are allocated a percentage of the SIP call control server processing resources, and the scheduler schedules the threads corresponding for execution by the processor according to the pre-defined policy.

10. The method of claim 1, further comprising running a plurality of threads of the messages on a processor, wherein each thread corresponds to a respective one of the queues, wherein the allocation of SIP call control server processing resources to each queue according to the pre-defined policy further comprises scheduling the threads for execution according to a scheduling policy.

* * * * *